US009486716B2

(12) United States Patent
Hackleman et al.

(10) Patent No.: US 9,486,716 B2
(45) Date of Patent: Nov. 8, 2016

(54) ESSENTIAL OIL EXTRACTION APPARATUS

(71) Applicant: State of Oregon acting by and through the State Board of Higher Education on behalf of Oregon State University, Corvallis, OR (US)

(72) Inventors: David Hackleman, Corvallis, OR (US); Bill Dean, Corvallis, OR (US); Carlos Antar Gutierrez Arriaga, Corvallis, OR (US); Frederick Atadana, Corvallis, OR (US); Tanawat Atichat, Corvallis, OR (US)

(73) Assignee: State of Oregon acting by and through the State Board of Higher Education on behalf of Oregon State University, Corvallis, OR (US)

( * ) Notice: Subject to any disclaimer, the term of this patent is extended or adjusted under 35 U.S.C. 154(b) by 902 days.

(21) Appl. No.: 13/691,243

(22) Filed: Nov. 30, 2012

(65) Prior Publication Data
US 2013/0240347 A1 Sep. 19, 2013

Related U.S. Application Data

(60) Provisional application No. 61/610,931, filed on Mar. 14, 2012.

(51) Int. Cl.
*B01D 3/02* (2006.01)
*B01D 11/02* (2006.01)
(Continued)

(52) U.S. Cl.
CPC . *B01D 8/00* (2013.01); *B01D 3/02* (2013.01); *B01D 3/40* (2013.01); *B01D 5/006* (2013.01);
(Continued)

(58) Field of Classification Search
CPC .............. B01J 19/126; B01J 19/24; B01J 2208/00442; B01J 2219/00141; B01J 2219/089; B01J 2219/1206; B01J 2219/1245; B01J 2219/1287; B01D 3/02; B01D 3/38; B01D 3/40; B01D 5/0003; B01D 5/006; B01D 5/0066; B01D 11/02; B01D 11/0296; B01D 11/0211; B01D 11/0219; C10G 1/04; C10G 1/045; C11B 9/027
See application file for complete search history.

(56) References Cited

U.S. PATENT DOCUMENTS 4,144,435 A * 3/1979 Clark ................... H05B 6/6494
219/712
5,711,857 A * 1/1998 Armstrong ........... B01D 1/0017
159/DIG. 26
(Continued)

FOREIGN PATENT DOCUMENTS

CA 2055390 A1 5/1992
CN 1061729 A 6/1992
(Continued)

OTHER PUBLICATIONS

EPO Translation of JP 2007289916, obtained Dec. 10, 2015.*
(Continued)

*Primary Examiner* — In Suk Bullock
*Assistant Examiner* — Jonathan Miller
(74) *Attorney, Agent, or Firm* — Klarquist Sparkman, LLP

(57) ABSTRACT

Disclosed herein are embodiments of an essential oil extraction apparatus. In some embodiments, the apparatus comprises a container configured to hold an essential oil-containing material, an essential oil extract receiver contained in the container, a condenser having an outlet fluidly coupled to the receiver and located relative to the container so as to receive essential oil-containing vapor emitted by the essential oil-containing material; and at least one microwave reflection structure associated with at least one of the container, the receiver or the condenser. The apparatus can have an overall dimension that is sufficiently small so that the apparatus fits inside a standard-sized kitchen microwave oven.

17 Claims, 5 Drawing Sheets

(51) Int. Cl.
  B01D 8/00   (2006.01)
  B01D 5/00   (2006.01)
  B01D 3/40   (2006.01)
  B01J 19/12  (2006.01)

(52) U.S. Cl.
  CPC ....... B01D 11/0211 (2013.01); B01D 11/0219 (2013.01); B01D 11/0296 (2013.01); B01J 19/126 (2013.01); *B01J 2208/00442* (2013.01)

(56) References Cited

U.S. PATENT DOCUMENTS

| | | | | |
|---|---|---|---|---|
| 5,884,417 | A * | 3/1999 | Pare | B01D 1/0017 34/263 |
| 8,282,788 | B2 * | 10/2012 | Lee | A23L 1/2217 137/511 |
| 8,282,789 | B2 * | 10/2012 | Lee | B01D 1/0029 137/511 |
| 8,802,021 | B2 * | 8/2014 | Chemat | B01D 5/0057 219/679 |
| 8,901,471 | B2 * | 12/2014 | Visinoni | A23L 1/00 219/679 |
| 8,933,380 | B2 * | 1/2015 | Duncan | H05B 6/806 219/687 |
| 2010/0062121 | A1 * | 3/2010 | Farid | B01D 5/0006 426/241 |

FOREIGN PATENT DOCUMENTS

| | | |
|---|---|---|
| CN | 1125461 A | 6/1996 |
| CN | 101358158 A | 2/2009 |
| JP | 2007-289916 A | 11/2007 |
| JP | 2008-073605 A | 4/2008 |
| JP | 2009 148658 | 7/2009 |
| JP | 4830749 B2 | 12/2011 |
| KR | 2012-0047039 A | 5/2012 |

OTHER PUBLICATIONS

EPO Translation of JP 2009148658, obtained Dec. 10, 2015.*
Patent Examination Report No. 1 from IP Australia for corresponding AU Application No. 2013232027, dated Oct. 30, 2015, 2 pages.
European Search Report for corresponding Application No. EP 13762014.2, mailed Oct. 19, 2015, 6 pages.
Examination Report from the New Zealand Intellectual Property Office in Application No. 630585, dated May 25, 2015, 2 pages.
Written Opinion dated Jul. 24, 2013, issued by the Korean Intellectual Property Office in corresponding PCT Application No. PCT/US2013/031471, filed Mar. 14, 2013.
International Search Report dated Jul. 25, 2013, issued by the Korean Intellectual Property Office in corresponding PCT Application No. PCT/US2013/031471, filed Mar. 14, 2013.
First Office Action from the State Intellectual Property Office of the People's Republic of China for corresponding JP Application No. 201380023360.7, dated Oct. 28, 2015, 20 pages.
Zhengke et al., "Instrument and Apparatus for Sample Pretreatment," *Chemical Industry Press*, (May 31, 2007).
Patent Examination Report No. 2 from IP Australia in Application No. 2013232027, dated May 10, 2016, 3 pages.

* cited by examiner

ESSENTIAL OIL EXTRACTION APPARATUS

CROSS-REFERENCE TO RELATED APPLICATION

This application claims the benefit of U.S. Provisional Patent Application No. 61/610,931, which was filed on Mar. 14, 2012, and is incorporated herein by reference in its entirety.

FIELD

This disclosure is related to an apparatus for extraction of essential oil from an essential oil-containing material.

SUMMARY

The extraction of small quantities of essential oils from plants can be accomplished using steam distillation, however assembling a small scale steam distillation system, such as for home use or otherwise, is not easily performed. With the advent of microwave ovens, people have a new tool available for performing steam distillation of essential oils.

Disclosed herein are embodiments of essential oil extractor apparatuses for use in a microwave oven or similar apparatus to enable the extraction of small quantities of essential oils or other organic material from natural sources.

One embodiment disclosed herein comprises an apparatus for extracting an essential oil from an essential oil-containing material. The apparatus comprises a container configured to hold an essential oil-containing material and configured to transmit microwaves through the container to the essential oil-containing material to cause the essential oil to vaporize. The apparatus further comprises a condenser coupled to the container and configured to receive and condense essential oil-containing vapor emitted by essential oil-containing material within the container. The apparatus further comprises an essential oil extract receiver positioned within the container and below the condenser and configured to receive condensed essential oil from the condenser. In some embodiments, the apparatus can further comprise at least one microwave reflection structure associated with at least one of the condenser or the receiver. The apparatus can have an overall dimension that is sufficiently small so that the apparatus fits inside a standard-sized kitchen microwave oven.

The condenser can be configured to contain a volume of condensing material, such as ice, having a temperature below a condensation temperature of the received vapor such that the received vapor is caused to condense by the condensing material. The condenser can comprise a condensation surface, of either a covering layer or the condensing material itself, that tapers from a broader upper end to a narrower lower end positioned above the receiver, such that condensed essential oil runs down the condensation surface, under the force of gravity and with surface tension as a limiter, and falls from the lower end into the receiver.

In some embodiments, a shield is positioned around the condensing material and configured to reflect and/or block microwaves from reaching the condensing material while allowing the received vapor to reach the condensing material. For example, the shield can comprise a Radio Frequency electrically conductive material, such as a metallic material. The shield can comprise a plurality of holes sized to allow received vapor to pass through but not microwaves. The diameter of the holes can be less than about one fourth of the wavelength of the microwaves. The shield can taper from a broader upper end to a narrower lower end. The shield can be spaced from the condensing material by a small gap such that condensed essential oil can run down the gap between the shield and the condensing material. The shield can have a hole at the lower end to allow liquid condensed essential oil and/or melted condensing material to pass downwardly through the outlet hole to the receiver.

In some embodiments, a microwave shield is positioned around the receiver. This shield can also comprise a Radio Frequency electrically conductive material, such as a metallic material. This shield can be generally cylindrical, and/or can comprise a plurality of holes that do not allow microwaves to pass through. The holes can allow for visual inspection of the contents of the receiver.

In some embodiments, the condenser comprises a lid and a retaining shaft extending downwardly from the lid. The shaft is configured to retain the condensing material to the lid when the condensing material is frozen onto the shaft. The lid can rest on top of the container with the frozen condensing material projecting downwardly into the container.

An exemplary method of steam distilling an essential oil from an essential oil containing material can comprise placing an essential oil containing material within a steam distilling apparatus, placing the steam distilling apparatus in a microwave oven, and causing the microwave oven to heat the essential oil containing material with microwaves such that the essential oil and water vaporizes (not necessarily boils) from the essential oil containing material, condenses on a condenser within the steam distilling apparatus, and collects in a receiver positioned within the steam distilling apparatus.

The method can further comprise, prior to placing the steam distilling apparatus in a microwave oven, freezing a liquid condensing material into a solid shape such that the frozen condensing material is secured to a lid, and then placing the frozen condensing material into the steam distilling apparatus with the lid sealing the essential oil containing material within the steam distilling apparatus.

The method can further comprise placing a volume of microwave absorbing material in a container in the microwave oven external to the steam distilling apparatus to absorb reflected microwave energy within the microwave oven.

The method can further comprise separating the essential oil collected in the receiver from a melted portion of the condenser also collected in the receiver.

The foregoing and other objects, features, and advantages of the invention will become more apparent from the following detailed description, which proceeds with reference to the accompanying figures.

DETAILED DESCRIPTION

Described herein are embodiments of an apparatus for extracting essential oil from essential oil containing material using a microwave oven. The embodiments described herein can be used to extract a variety of essential oils, such as peppermint oil, oil of lavender, hop oil, orange peel oil, and other botanical oils. The embodiments described herein can also be used to extract other modest sized organic molecules from source materials, such as alcohols and/or materials with a boiling point lower than that of water. For example, these other low-boiling-point compounds can be used as an extraction vehicle instead of water to extract the desired oils. With this broad applicability in mind, the remainder of this description proceeds with reference mainly to the extraction of essential oils for ease of description but without limiting the applicability of the disclosed apparatuses and methods in any way.

The disclosed apparatuses function generally by placing a source of essential oil, such as peppermint leaves, into an outer container of the apparatus and energizing the material in a microwave oven. The essential oil and/or water vaporizes and the apparatus fully or mostly traps the vapors, causes them to condense into liquid, and collects the condensed liquid in a receiver positioned within the outer container.

The apparatus can comprise an outer container in which to put the material from which the essential oil is to be extracted, a condenser for the essential oil to condense upon along with some of the water vaporized from the essential oil source material and/or water added to that source to enable the extraction process, and a receiver of some sort to collect the condensed liquid. In some embodiments, the apparatus also comprises a means to direct the condensed liquid to a receptacle, or other element of the system to collect both the essential oil and the water carrier in a manner to allow one to draw away and utilize the essential oil.

In some cases, parts of the apparatus can be cooled with ice (or dry ice) or by being of large thermal mass which can be refrigerated or otherwise cooled prior to use. This can increase the ability to condense the oils and/or increase the capacity of the process. For example, the ice may be located inside the funnel-shaped condenser. The ice may be suspended from the outer lid of the container. The ice may be molded on a peg which is attached to the lid. The mold can be a funnel which is removed before the ice is then suspended in the container.

Figure 1:
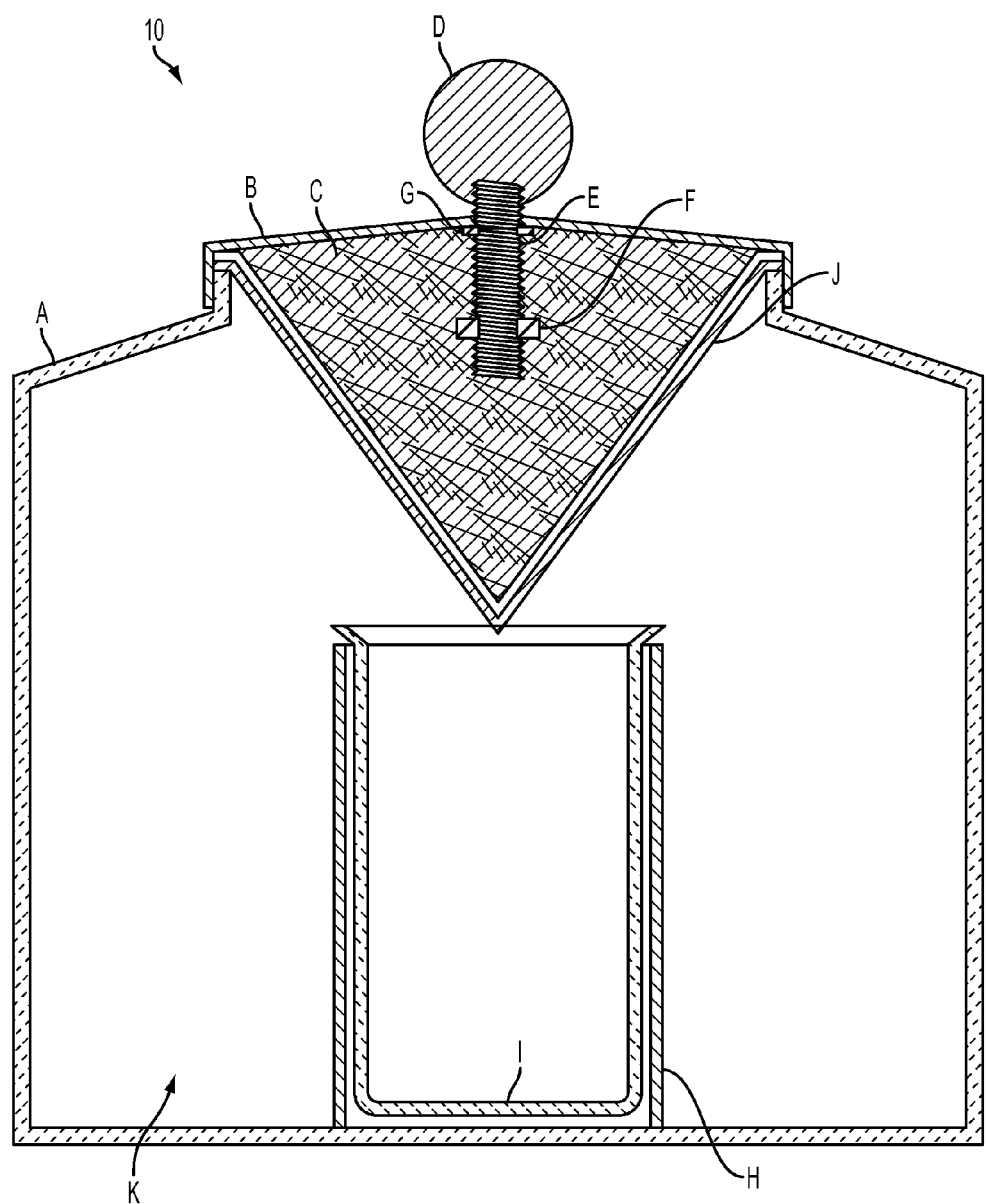
FIG. 1 is a cross-sectional view of an exemplary embodiment of an essential oil extraction apparatus.
Figure 2:
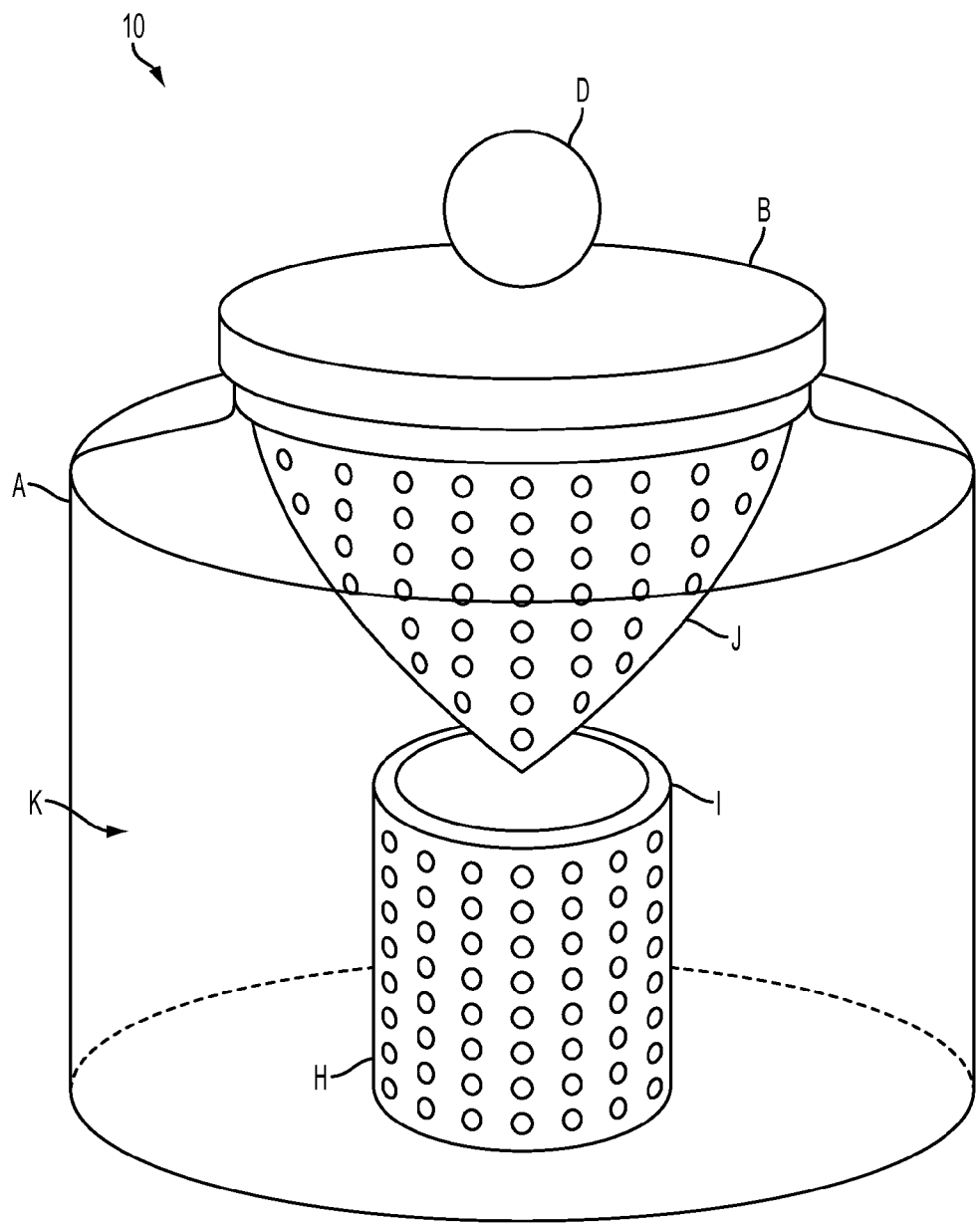
FIG. 2 is a perspective view of the apparatus of FIG. 1.

An exemplary apparatus 10 is shown in FIGS. 1 and 2. The apparatus 10 comprises an outer container A, a lid B, condensing material C, a knob or handle D, a shaft or bolt E, a nut or retaining member F, a microwave reflector or shield J, a receiver I, another microwave reflector or shield H, and/or other components.

The outer container A can comprise a microwave transmissive material that can also be light transmissive for convenience of use, such as glass, polyethylene terephthalate (PET), polytetrafluoroethylene (PTFE), polyvinylidene fluoride (PVDF), or borosilicate glass. The container A can have any shape configured to hold a mass of essential oil containing material or other source material, in solid and/or liquid form, and can have an upper opening.

The condenser material C can comprise ice, dry ice, or other relatively cold and/or solid/frozen material with a high thermal capacity capable of condensing vaporized oil and steam (or other vehicle) on its surface or on a layer of another material adjacent to its surface.

The shield J can conform to the shape of the material C and can have holes in it to allow vapor to pass through the holes to reach the material C. The holes can be small enough to not allow microwaves to pass through such that the heating of the material C by the microwaves is minimized. For example, the holes can have a maximum diameter of less than or equal to about $\frac{1}{10}$ or about $\frac{1}{100}$ of the wavelength of the microwaves. For a 2.4 GHz microwave oven, the holes can have a maximum diameter of less than about 1.3 cm, such as less than about 1.0 cm. In one example, the holes have a diameter of about 0.16 cm.

The shield J can be positioned with a space or gap between its inner surface and the material C, as shown in FIG. 1, such that liquid and vapor can flow between the two surfaces. In some embodiments, the shield J can be in the shape of a funnel with a lower outlet wherein the condensed liquids flows through the outlet and into the receiver I.

Both the material C and the shield J, if present, can have a tapered shape with broader upper ends and narrower or pointed lower ends. In some embodiments, the tapered shape can be conical, as shown in FIG. 1. In other embodiments, the tapered shape can have a non-conical surface, such as a concave hyperbolic surface, such as in the surface 104 in embodiment 100 shown in FIG. 5. In other embodiments, the material C and/or the shield J can have non-tapered shapes, such as a cylindrical or other shape with a vertical or non-sloped surface.

The lid B can support the material C and can be coupled to and/or rest on top of the shield J and cover the upper opening of the outer container A. The lid B can be a solid sheet or it can be a perforated sheet. The lid B can suspend the material C below via a shaft E onto which the material C is secured. For example, the shaft E can include a nut or other laterally extending member F and the material C can be frozen onto the shaft E such that the material C is secured onto the shaft E until it melts or brakes away from the shaft. The shaft E can extend through the lid B and coupled to a handle D for ease of use.

The receiver I can comprise any type of receptacle, separate from or integral with the container A, and positioned below the condenser portion such that it collects liquid dripping or flowing down from the material C and/or shield J. The receiver I can include or be surrounded by another microwave reflector or shield H, which can comprise a layer of material made from a conducting material (e.g., metal) and it may or may not be perforated. The shield H can be similar in composition to the shield J. The shield H can comprise holes that have a maximum diameter less that about $\frac{1}{10}$ or about $\frac{1}{100}$ of the wavelength of the microwaves in order to reduce the amount of microwave heating of the liquid collected in the receiver I.

Figure 3:
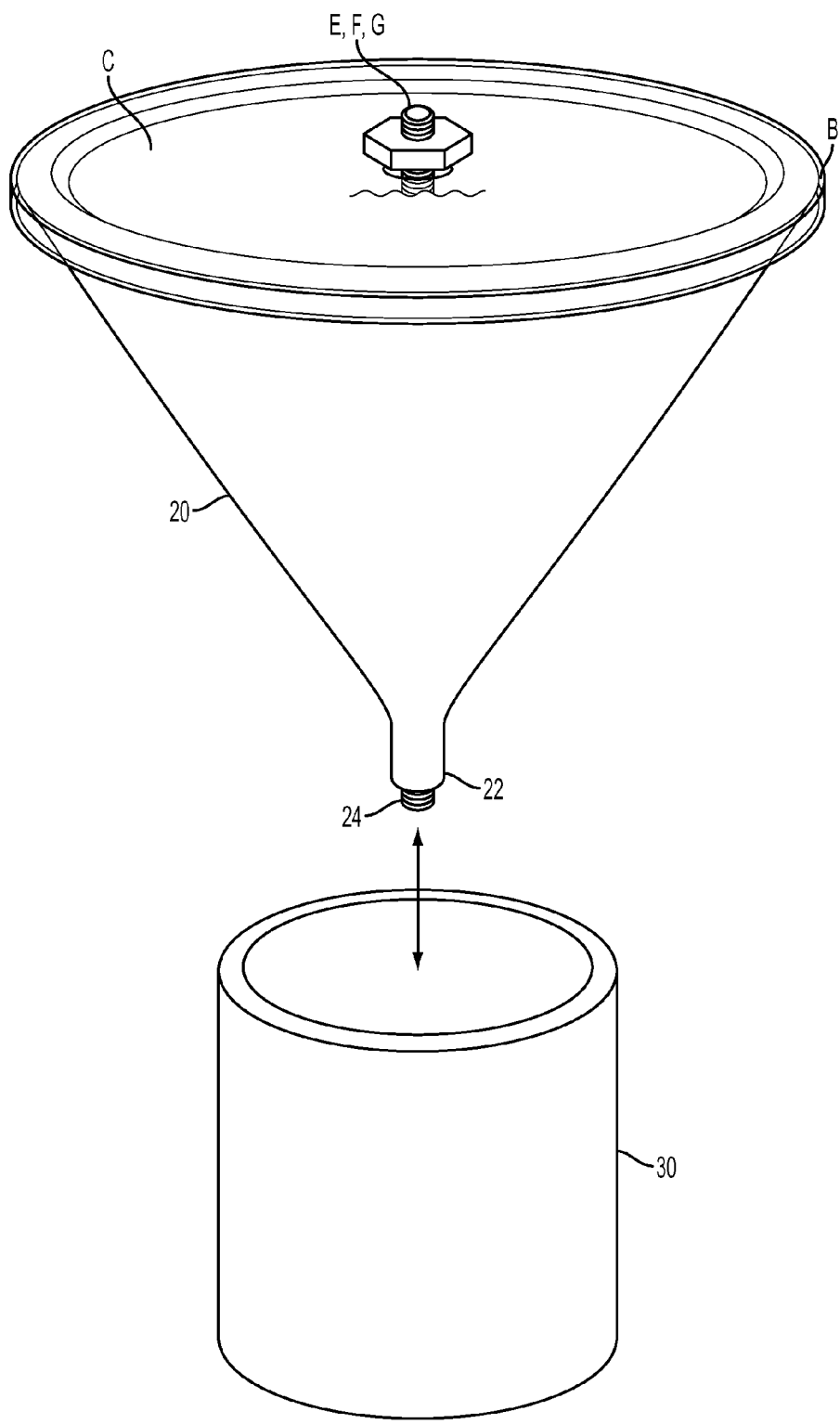
FIG. 3 is a perspective view of an exemplary mold containing a mass of solid condensing material coupled to a lid of the apparatus of FIG. 1.

FIG. 3 shows the condensing material C formed within an exemplary mold 20 with a cover B covering the top of the mold and the shaft E extending from the cover and embedded in the material C. In some embodiments, the cover B in FIG. 3 is different than the lid B shown in FIGS. 1 and 2, while in other embodiments they are the same element. The mold 20 can have any shape to cause the material C to freeze into that shape. The mold 20 can comprise a lower opening 22 that filled with a movable or expandable/compressible plug 24. With the plug 24 in the opening 22, the mold can be filled with a liquid form of the material C. The cover B and shaft E can be placed over the mold 20 with the shaft E within the liquid material C. The assembly can be placed in a support 30, such as a cup or stand, to hold it upright with the opening 22 pointed down and placed in a cooling chamber, such as a freezer. As the material C freezes, it can expand can cause the plug to move or compress such that it does not overflow the mold 20 and/or to minimize the upward expansion of the material C. After the material C is frozen, the material C and attached shaft E can be removed from the mold 20 and inserted into the apparatus 10. In some embodiments, the lid B (of FIGS. 1 and 2) can be attached to the shaft E after the material C is removed from the mold 20. In other embodiments, the cover B remains attached to the shaft E and both are placed into the apparatus 10 along with the frozen material core C.

The mold 20 can be comprised of or be coated with a low friction material, such as PTFE, that reduces adhesion to the frozen material C so that it can be easily removed. In some embodiments, the material C can be contained in a permanent container/mold that remains with the material C when it assembled with the apparatus 10. For example, if a material other than water is used as the material C, it may be desirable to reuse the same material C multiple times without allowing the melted liquid to drip down into the contain and need to be replaced. Recycling the material C can reduce the expense of the process over repeated cycles. In such an embodiment, the oil vapor condenses on the outer surface of the container/mold encapsulating the material C instead of directly on the material C.

Figure 5:
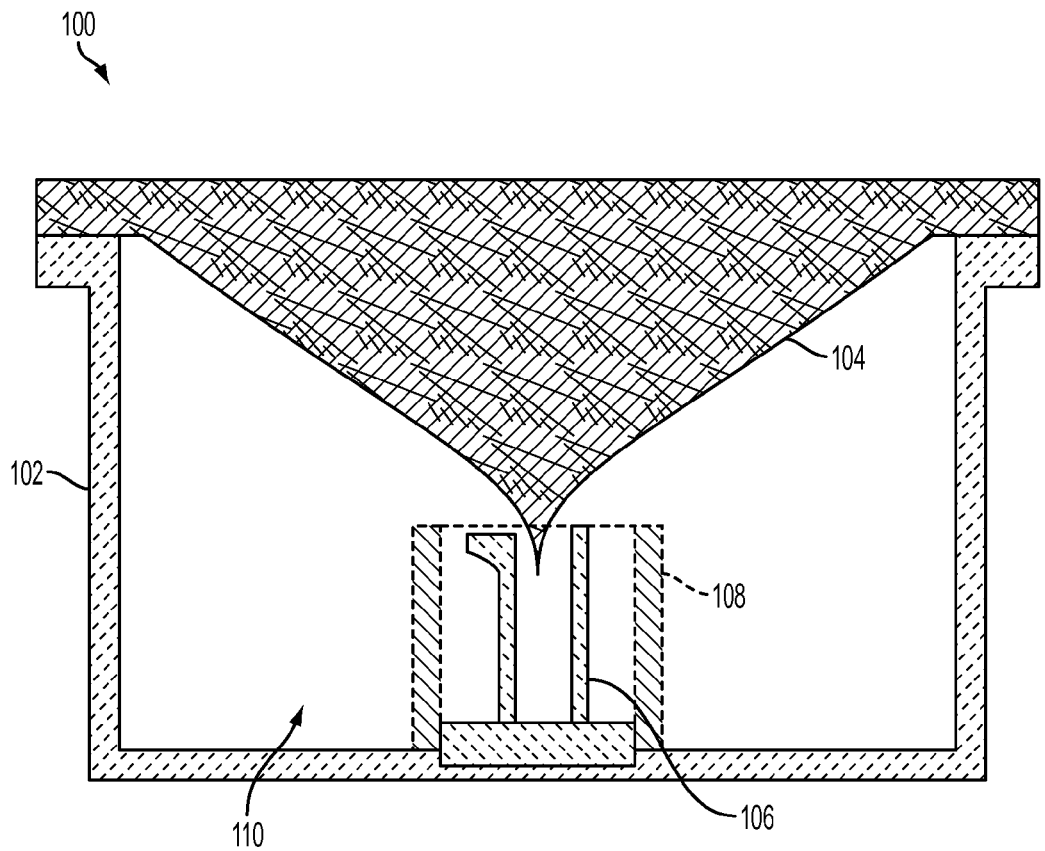
FIG. 5 is a cross-sectional view of another exemplary embodiment of an essential oil extraction apparatus.

Another embodiment 100 of an essential oil extraction apparatus is shown in FIG. 5. The apparatus 100 is similar functionally to the apparatus 10, and comprises an outer container 102, a condenser 104, a receiver 106, and a shield 108. The condenser 104 can comprise a solid unit comprised of a material having a high thermal capacity. The condenser 104 can be cooled prior to use such and be configured to maintain a cool temperature for a sufficient time to allow for the oil extraction process to occur in a microwave oven as described above. The condenser 104 can comprise a material that is substantially transmissive to microwaves such that it is not substantially heated by the microwaves. Oil containing material and/or water or other materials are positioned at 110 within the container 102. The microwave heating vaporizes the oil which condenses on the tapered lower surface of the condenser 104 and drips down into the receiver 106. The receiver 106 can be surrounded by a microwave shield 108, which can be substantially as described above with reference to the shield H of apparatus 10.

Figure 4:
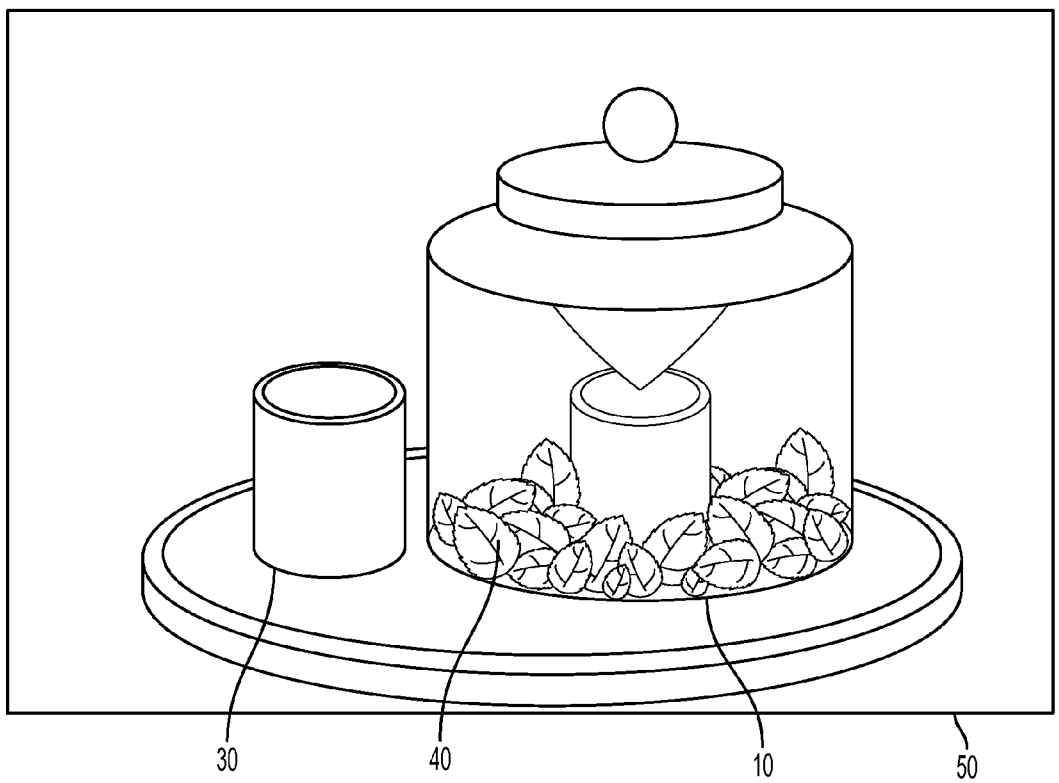
FIG. 4 shows the apparatus of FIG. 1 positioned within a microwave oven with an essential oil containing material within the apparatus.

The apparatuses disclosed herein can be sized to fit inside a standard-size microwave oven, in many cases it would be resting on a rotating turntable within the oven. For example, FIG. 4 shows the apparatus 10 within a microwave oven 50 with oil containing material 10 within the apparatus 10. In certain embodiments, the extraction apparatus is sized so that it fits inside a space ranging from 25 cm tall×35 cm wide×25 cm deep, more particularly, 30 cm tall×50 cm wide×35 cm deep, to 40 cm tall×75 cm wide×50 cm deep. In other embodiments, the apparatus can be scaled to fit inside microwave ovens of smaller than standard size (such as 600 W units) or of greater than standard size. In some embodiments, devices other than a microwave oven can be used to apply microwave energy to the apparatus.

Upon energizing the microwave oven 50 (or other application of microwave energy), the source of the essential oil 40 will experience heating and in time, vaporization of the water/liquid hence, carrying via Raoult's law of partial pressures, molecules of the essential oil (even at temperatures below its vaporization point) in a vapor phase consisting of steam and the attending essential oil molecules. This vapor cloud impinges upon the surface of the condenser portion of the apparatus 10 and condenses into its liquid state and drips down into the receiver.

At the temperatures of operation, many essential oils will separate from liquid water within the receiver due to density difference. In the particular case of peppermint oil, it is of lower density than water and will "rise" to the surface of a container adequately filled with the mixture. In this case, it is a simple matter of drawing off the essential oil either by decanting, spoon or utilization of a pipette (or eyedropper), or other process for separating the oil from the water and/or melted condensing material C. Upon replenishment of more of the essential oil source, more essential oil can be extracted.

In some embodiments, the surfaces on which the oil condenses, such as the surfaces of the shield/funnel J, the material C, and/or the condenser 104, can be coated with a material to alter the contact angle (of the condensing fluid) to reduce wetting and enhance coalescence and transport of the condensate to the receiving vessel. Examples can include Teflon®/PTFE coating or silicone coating. The microwave shields J, H, and/or 108 can comprise a Radio Frequency electrically conductive material, such as aluminum, steels, and other non-eroding, conducting, and/or metallic materials. In addition, coating the condensing surfaces with a material which exhibits a propensity to not "wet" with the compounds being transferred nor with water can enhance the performance of the apparatus. Some essential oils are not aqueous and in fact are not hydrophilic, so the material coating can be selected based on having a high contact angle and/or no "wetting" for either the essential oil or water or both. Examples include, but are not limited to fluorinated carbon chain polymers often referred to by the brand name "Teflon®", waxes and many other hydrophobic compounds. Other exemplary materials include high melting point polyethylenes, some forms of ceramic glazes, and either oxidization or anodization of metals, such as anodized aluminum. Rendering the conducting material of the system "hydrophobic" can be advantageous and improve the performance of the apparatus.

The incorporation of microwave reflection structures, such as shield J, into the design of the condenser/funnel to deflect the microwave energy form the material C (or other coolant reservoir) can increase the efficiency as well as reduce the rate of melting of the material C (or temperature elevation of the coolant, or heat transfer from microwave energy directly to the coolant). This can allow more of the ice or other material C to be used toward vapor condensation in the extraction process.

For example, a shield having a 2.4 GHz reflective pattern, such as a shield designed to appear as an open circuit or wave reflector, placed over the surface of the condenser can reflect a substantial portion of the incident microwave energy such that it does not directly heat the material that is inside the condenser. Thus, it can be desirable to use the microwave energy to heat the oil source material and not the condenser coolant. Having the shield be an open circuit and/or reflective to microwave energy can result in the shield protecting the cooled and condensed liquids on the surface of the material C such that the condensed liquid exposed to less microwave energy, and hence will tend to stay condensed. It is desirable that microwave heating of the oil is minimized from the point of condensation through until it is collected in the receiver and the microwaving process is stopped.

The curvature of the funnel/condenser material can be modified to enhance the collection of the oil. Examples include the use of a parabolic or hyperbolic curve (instead of a straight funnel cone). As droplets coalesce, they will travel down (through the force of gravity combined with the minimization of surface area and formation of droplets) the curve and collect in the collection receiver. This can enhance the ability of the oil to all collect in the cup instead of remaining on the surface of the condenser/funnel and hence improves the simplicity of operation by the user.

The lip of the outer container can be configured to encourage the vapors to coalesce on the inner funnel/condenser instead of on the outer container. For example, a radius of curvature can be used on the spot where the two pieces meet (the funnel/condenser and the outer shell that holds the oil source material and suspends the funnel/condenser) such that the tendency for a droplet as it is condensing and forming is to travel to and/or down the funnel/condenser instead of travelling town the outer wall. The outer wall will tend to be kept warmer than the funnel/condenser since all the microwave energy need pass through this material to heat the oil source material within. So, by appropriate design of both the angle of the contact between the two pieces of the assembly (funnel/condenser and outer shell), the droplets as they coalesce can be better directed to the receiving cup.

A "gutter" can be included around the outer edge (inside) of the outer container to collect that condensate from the outer wall and allow it to be part of the extraction. In addition to or instead of radiusing the upper lip of the outer container, this gutter approach allows any condensate which drops from the outer wall to be collected instead of refluxing into the source material.

The shape and profile of the tip of the funnel/condenser can be configured to facilitate droplet coalescence and delivery to the collection vessel. A relatively sharp point on the end of the funnel/condenser can enable a droplet to "break-off" more easily than one with a wide, flat bottom surface.

In some embodiments, a material other than water/ice, such as "blue Ice®" (or similar glycol material) can be used to provide a re-useable funnel/condenser with less coefficient of thermal expansion while undergoing the freeze/thaw cycle. This refrigerant can be placed in a semi-flexible container in the shape best designed for the funnel/condenser, for example. This eases the use and provides a convenient method for the user of the product to cycle through a multiplicity of extractions by merely replacing the coolant. An alternative is to place the funnel/condenser assembly in a heat extraction unit such as a freezer and allow it to re-cool. The apparatus can include multiple sets of the funnel/condenser/coolant or multiple coolant semi rigid containers for repeated use.

General Considerations

For purposes of this description, certain aspects, advantages, and novel features of the embodiments of this disclosure are described herein. The disclosed methods, apparatuses, and systems should not be construed as limiting in any way. Instead, the present disclosure is directed toward all novel and nonobvious features and aspects of the various disclosed embodiments, alone and in various combinations and sub-combinations with one another. The methods, apparatuses, and systems are not limited to any specific aspect or feature or combination thereof, nor do the disclosed embodiments require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "determine" and "provide" to describe the disclosed methods. These terms are high-level abstractions of the actual operations that are performed. The actual operations that correspond to these terms may vary depending on the particular implementation and are readily discernible by one of ordinary skill in the art.

As used herein, the terms "a", "an" and "at least one" encompass one or more of the specified element. That is, if two of a particular element are present, one of these elements is also present and thus "an" element is present. The terms "a plurality of" and "plural" mean two or more of the specified element.

As used herein, the term "and/or" used between the last two of a list of elements means any one or more of the listed elements. For example, the phrase "A, B, and/or C" means "A," "B," "C," "A and B," "A and C," "B and C" or "A, B and C."

As used herein, the term "coupled" generally means physically coupled or linked and does not exclude the presence of intermediate elements between the coupled items absent specific contrary language.

In view of the many possible embodiments to which the principles of the disclosure may be applied, it should be recognized that the illustrated embodiments are only preferred examples and should not be taken as limiting the scope of the disclosure. Rather, the scope of the disclosure is defined by the following claims. We therefore claim all that comes within the scope of these claims.

We claim:

1. An apparatus for extracting an essential oil from an essential oil-containing material, the apparatus comprising:
   a container configured to hold an essential oil-containing material and configured to transmit microwaves through the container to the essential oil-containing material to cause the essential oil to vaporize;
   a condenser coupled to the container and configured to receive and condense essential oil-containing vapor emitted by essential oil-containing material within the container, wherein the condenser comprises a volume of condensing material having a temperature below a condensation temperature of the received vapor such that the received vapor condenses on the condensing material;
   a microwave blocking shield positioned around the condensing material, the shield comprising a plurality of holes that allow received vapor to pass through the shield to reach the condensing material but do not allow microwaves to pass through the shield to reach the condensing material; and
   an essential oil extract receiver positioned within the container and below the condenser and configured to receive condensed essential oil from the condenser;
   wherein the apparatus has an overall dimension that is sized to fit inside a microwave oven.

2. The apparatus of claim 1, wherein the condenser comprises a condensation surface that tapers from a broader upper end to a narrower lower end positioned above the receiver, such that condensed essential oil runs down the condensation surface and falls into the receiver.

3. The apparatus of claim 1, wherein the shield tapers from a broader upper end to a narrower lower end.

4. The apparatus of claim 1, wherein the shield is spaced from the condensing material such that condensed essential oil can run down between the shield and the condensing material.

5. The apparatus of claim 3, wherein the shield comprises an outlet hole at the lower end that allows condensed essential oil to pass downwardly through the outlet hole to the receiver.

6. The apparatus of claim 1, further comprising a cylindrical Radio Frequency electrically conductive shield positioned around the receiver and configured to block microwaves from reaching the receiver.

7. The apparatus of claim 6, wherein the shield positioned around the receiver comprises a plurality of holes that do not allow microwaves to pass through.

8. The apparatus of claim 7, wherein the holes in the shield positioned around the receiver have a maximum diameter that is less than or equal to about 1/10 of the wavelength of microwaves produced by the microwave oven.

9. The apparatus of claim 1, wherein the condenser comprises a lid and a retaining shaft extending downwardly from the lid, the shaft configured to retain the condensing material to the lid when the condensing material is frozen onto the shaft.

10. The apparatus of claim 1, wherein the holes in the shield have a maximum diameter that is less than or equal to about 1/10 of the wavelength of microwaves produced by the microwave oven.

11. The apparatus of claim 1, wherein the condensing material comprises dry ice.

12. The apparatus of claim 9, wherein the condensing material comprises a frozen fluid that has solidified around the shaft to fix the condensing material to the lid.

13. A method of distilling an essential oil from an essential oil containing material, the method comprising:
  placing an essential oil containing material within the apparatus of claim 1;
  placing the apparatus in a microwave oven; and
  causing the microwave oven to heat the essential oil containing material with microwaves such that the essential oil vaporizes from the essential oil containing material, condenses on the condenser, and collects in the receiver.

14. The method of claim 13, wherein the receiver is protected by a microwave-reflective shield.

15. The method of claim 13, further comprising, prior to placing the apparatus in a microwave oven:
  freezing a liquid condensing material into a solid shape such that the frozen condensing material is secured to a lid; and
  placing the frozen condensing material into the apparatus with the lid sealing the essential oil containing material within the apparatus.

16. The method of claim 13, wherein a portion of the condenser melts and is also collected in the receiver, and wherein the method further comprises separating the essential oil from the melted portion of the condenser.

17. The method of claim 13, wherein placing the apparatus in a microwave oven comprises placing a volume of microwave absorbing material in a container in the microwave oven external to the apparatus.

* * * * *